(12) United States Patent
Nagashima

(10) Patent No.: US 7,702,790 B2
(45) Date of Patent: Apr. 20, 2010

(54) NETWORK SYSTEM AVAILABLE FOR SIMULTANEOUS CONNECTIONS OF PLURAL PIECES OF EQUIPMENT, ADVANCED EQUIPMENT IN THE SYSTEM, METHOD OF USING FUNCTIONS OF ANOTHER PIECE OF EQUIPMENT, AND STORAGE MEDIUM

(75) Inventor: Takayuki Nagashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 2111 days.

(21) Appl. No.: 09/951,613

(22) Filed: Sep. 14, 2001

(65) Prior Publication Data

US 2002/0040399 A1 Apr. 4, 2002

(30) Foreign Application Priority Data

Sep. 28, 2000 (JP) ............................. 2000-297455

(51) Int. Cl.
*G06F 15/16* (2006.01)
(52) U.S. Cl. ......................... 709/227; 709/223; 709/246
(58) Field of Classification Search ................. 709/227, 709/223, 246; 715/530
See application file for complete search history.

(56) References Cited

U.S. PATENT DOCUMENTS

| | | | | |
|---|---|---|---|---|
| 5,771,065 A * | 6/1998 | Hijikata et al. | ............ | 348/14.11 |
| 5,812,865 A | 9/1998 | Theimer et al. | | |
| 5,818,425 A * | 10/1998 | Want et al. | ................... | 345/158 |
| 6,195,545 B1 | 2/2001 | Baker et al. | ................. | 455/414 |
| 6,246,335 B1 * | 6/2001 | Tsunoda | ..................... | 340/7.2 |
| 6,287,200 B1 * | 9/2001 | Sharma | ........................ | 463/40 |

(Continued)

FOREIGN PATENT DOCUMENTS

EP  0 860 966  8/1998

(Continued)

OTHER PUBLICATIONS

N. Anerousis, et al., "TOPS: An Architecture for Telephony over Packet Networks", IEEE Journal On Selected Areas In Communications, vol. 17, No. 1, Jan. 1999.

(Continued)

*Primary Examiner*—John Follansbee
*Assistant Examiner*—Nghi V Tran
(74) *Attorney, Agent, or Firm*—Fitzpatrick, Cella, Harper & Scinto

(57) ABSTRACT

There is provided a network system and its associated devices and techniques which allow a terminal device to utilize functions of another terminal device without the need to provide any dedicated interface or system switch. A server 12 receives a service request from a first terminal device 13 or a second terminal device 16 while the first and second terminal devices 13 and 16 are in voice communication with each other. Upon receipt of the service request, the server 12 searches position information on the second terminal device 16 from an identifier contained in the service request to specify a processor 18 located in the neighborhood of the second terminal device 16 on the basis of the position information. Then the server 12 establishes a new connection (communication lines 2B and 2C) for image communication. Thus the image data is transferred from the first terminal device 13 to a reception device 17 through the communication lines 2B and 2C, and displayed on a large screen of the processor 18.

13 Claims, 6 Drawing Sheets

U.S. PATENT DOCUMENTS

| | | | |
|---|---|---|---|
| 6,661,465 B2 * | 12/2003 | Zhu et al. | 348/552 |
| 6,677,987 B1 * | 1/2004 | Girod | 348/171 |
| 6,735,741 B1 * | 5/2004 | Pannu | 715/530 |
| 6,750,830 B1 * | 6/2004 | Teshima et al. | 345/1.2 |
| 6,826,551 B1 * | 11/2004 | Clary et al. | 706/46 |
| 6,836,768 B1 * | 12/2004 | Hirsch | 707/3 |
| 7,199,787 B2 * | 4/2007 | Lee et al. | 345/169 |
| 2002/0002584 A1 * | 1/2002 | Takagi et al. | 709/204 |

FOREIGN PATENT DOCUMENTS

| | | |
|---|---|---|
| EP | 0860966 | 8/1998 |
| JP | 11-331957 | 11/1999 |

OTHER PUBLICATIONS

"TOPS: An Architecture for Telephony over Packet Networks", Nikolaos Anerousis, et al., IEEE Journal on Selected Areas in Communications, IEEE Service Center, vol. 17, No. 1, Jan. 1999.

European Office Action issued on May 12, 2009 in EP Application No. 01 308 092.4-1244.

* cited by examiner

NETWORK SYSTEM AVAILABLE FOR SIMULTANEOUS CONNECTIONS OF PLURAL PIECES OF EQUIPMENT, ADVANCED EQUIPMENT IN THE SYSTEM, METHOD OF USING FUNCTIONS OF ANOTHER PIECE OF EQUIPMENT, AND STORAGE MEDIUM

BACKGROUND OF THE INVENTION

1 Field of the Invention

The present invention relates to a network system available for simultaneous connections of plural pieces of terminal equipment such as portable communication terminals, advanced equipment in the system, a method of using functions of another piece of equipment, and a storage medium.

2 Description of the Related Art

Conventionally, in the area of portable communication terminal devices, voice-only telephones or advanced terminals capable of exchanging textual information in addition to voice information have become commercially practical. Further, image exchangeable terminals such as video telephones and personal computers are now on the market. On the other hand, in the area of display devices, compact display devices with excellent portability and low power consumption such as liquid crystal displays are proceeding toward practical utilization. In addition, display devices for possible adoption into portable terminals have also been studied and become commercially practical.

However, when combining a portable terminal with a display device, a tradeoff will have to be made between portability of a compact terminal and visibility of a larger display screen. In other words, providing a large, high-definition display device increases the size of the portable terminal and hence reduces its portability. On the other hand, if high priority is given to portability, the screen size has to be reduced, which makes it difficult to display images with high definition on a large screen.

To solve the above-mentioned problem, a video telephone system has been proposed, in which a display device is provided on a desktop-type public terminal accessible from portable telephones or terminals so that a large, easy-to-see display screen can be obtained with maintaining the portability of portable terminals. This proposal, however, needs to prepare public terminals and portable terminals, both of which have a dedicated interface.

On the other hand, as digital-network penetration increases in telecommunications, various kinds of additional services are now available such as to establish another connection with maintaining current connection between communication partners. Even through an existing analog network, plural connections are possible by multiplexing via a modem or the like.

For example, U.S. Pat. No. 6,195,545 (Japanese Patent Laid-Open Application No. 11-331957) discloses a call processing method in which a proximity-based temporary association is established, within a system switch, between a terminal and at least one other terminal. While the terminal is associated with the other terminal, the terminal user can utilize the functions of the other terminal.

The call processing method according to U.S. Pat. No. 6,195,545 (Japanese Patent Laid-Open Application No. 11-331957) can assume such utilization that a portable terminal accesses a display facility of another terminal. This utilization can solve the above-mentioned problem. Since U.S. Pat. No. 6,195,545 discloses call processing within a system switch, it is adopted to a local-area network, but its application to a wide-area network requires the installation of new or additional system switches or addition of functions to the system switch, resulting in the need to change the entire network.

SUMMARY OF THE INVENTION

It is an object of the present invention to enable a terminal to utilize functions of another terminal without the need to provide a new dedicated interface or dedicated system switch.

According to one aspect of the invention, a network system includes plural service providing devices for processing predetermined data to provide predetermined service features, at least a server, and at least first and second terminal devices. The network system has a specification means which specifics a service providing device to be utilized from among the plural service providing devices in response to a request from at least either the first terminal device or the second terminal device. A connection establishing means establishes a new connection between the first terminal device and the service providing device specified by the specification means, and a data transmission means transmits the predetermined data from the first terminal device to the service providing device through the new connection established by the connection establishing means.

In another aspect, the network system has a first communication means by which a first terminal device and a second terminal device communicate with each other through a first communication line, and means for forming a second communication line through which information transmitted from the first terminal device is output to a third terminal device on the basis of information related to at least the position of the second terminal device while the first communication means is providing communication between the first and second terminal devices.

In a related aspect of the invention, a communication device has a first establishment means for establishing a connection with a first device, a second establishment means for establishing a connection with a second device specified on the basis of position information on the first device, and transmission means for transmitting data through the connection established by the second establishment means with maintaining the connection established by the first establishment means.

Another related aspect of the invention is a server that has a reception means for receiving a predetermined request from either a first or a second device while a connection is established between the first and second devices, and specification means for specifying a third device on the basis of position information on the second device in response to the predetermined request received by the reception means.

Other objects of the present invention will become apparent from the following detailed description and the accompanying drawings.

DESCRIPTION OF THE PREFERRED EMBODIMENTS

Embodiments of the present invention will be described below with reference to the accompanying drawings.

First Embodiment

Figure 1:
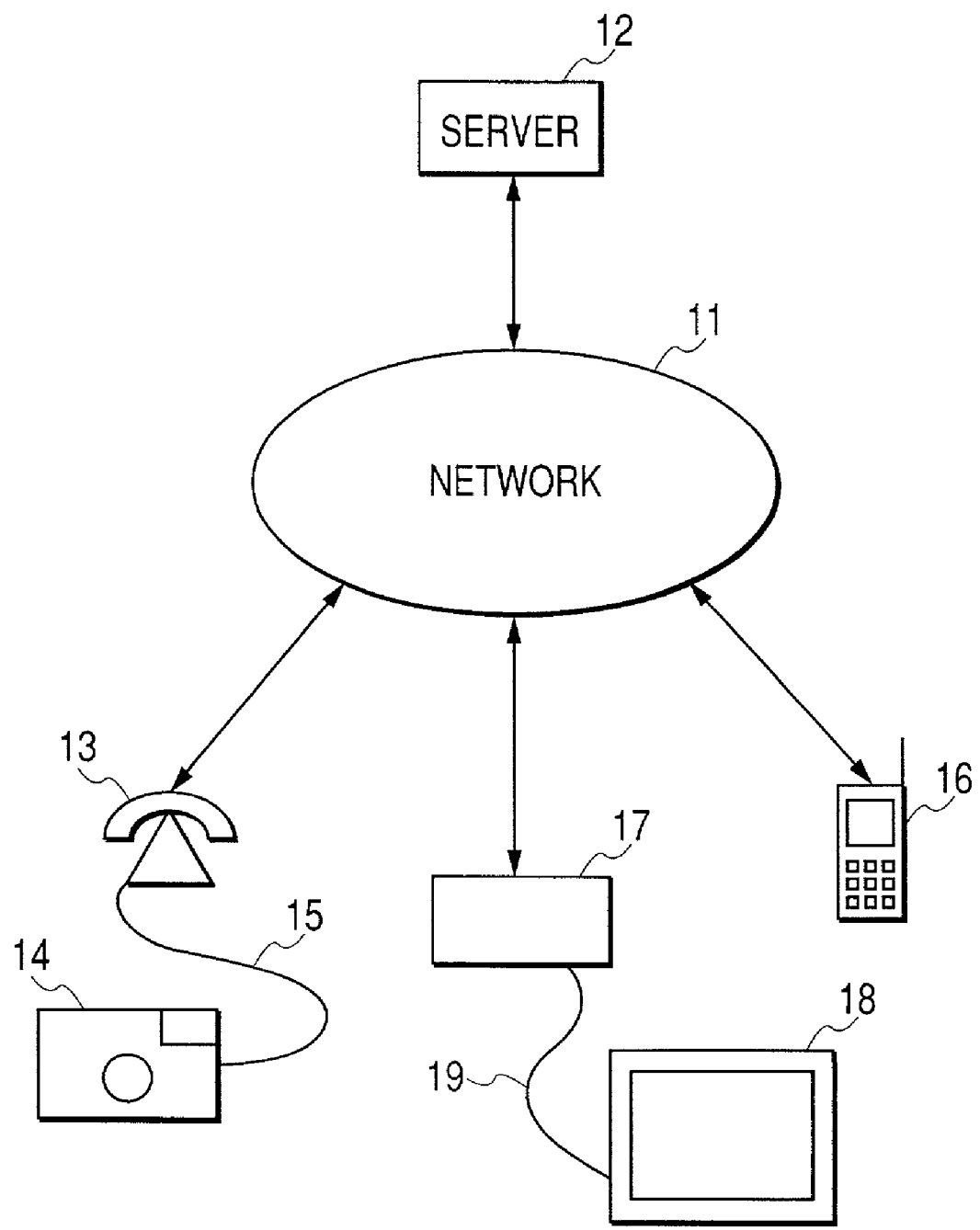
FIG. 1 is a block diagram illustrating the general structure of a network system according to a first embodiment of the present invention.

FIG. 1 is a block diagram illustrating the general structure of a network system according to the first embodiment of the present invention.

The reference numeral 11 is a single network or a network in which plural sub-networks are interconnected. A server 12 is connected to the network 11 to provide transaction-undertaking services. A first terminal device 13 is connected to the network 11; it has service features such as voice and image communications. An additional device 14 such as a camera is connected to the first terminal device 13; it is used to realize service features of this embodiment, such as to input a still or video picture. A transmission line 15 is to establish a logical connection between the terminal device 13 and the additional device 14.

A second terminal 16 is a mobile terminal connected to the network 11; it also has service features such as voice an image communications. A display screen, not shown, of the second terminal 16 is made compact in consideration of portability.

A reception device 17 is connected to the network 11. A processor 18 has at least a function for processing data related to service features of the embodiment received at the reception device 17. The processor 18 is an image processor having a large display, not shown, and has the capability of displaying image data received at the reception device 17. Two or more combinations similar to that of the reception device 17 and the processor 18 are connected to the network 11. A transmission line 19 is to establish a logical connection between the reception device 17 and the processor 18.

It should be noted that a single network or sub-networks constituting the network 11 may be of any type such as a wired system, a wireless system, a public network, a dedicated network, a private network, the Internet, etc. Further, the first terminal device 13 and the additional device 14, or the reception device 17 and the processor 18 may be integrated into one body. The server 12 pre-stores and manages information related to functions, attributes and positions of all devices to be connected to the network 11. For example, the server 12 may pre-store and manage information related to the presence or absence of a display facility, attributes of the display facility if any, such as the size of the display, a physical position of a device, and another device located close to the device.

As an example, the embodiment illustrates processing for displaying image data as a service feature sent from the first terminal 13 to the second terminal 16 while the first and second terminals 13 and 16 are in voice communication with each other. Though details will be described later, the processing begins when a request is made for transmission of image data from the first terminal 13 to the second terminal 16 while the first and second terminals 13 and 16 are in voice communication with each other. In this case, the service providing server 12 is so accessed that the first terminal 13 can obtain temporary permission to utilize a processor 18 located in the neighborhood of the second terminal 16 on which side an image is to be seen via the server 12. Upon obtaining temporary permission, a new connection is established between the first terminal 13 and the processor 18, and the image is displayed on a large screen of the processor 18. While the image is being displayed, the original vice communication is kept connected. Upon completion of the communications, the voice communication line between the first and second terminals 13 and 16, and the image-data communication line between the first terminal 13 and the reception device 17 are released in any sequence.

Figure 2:
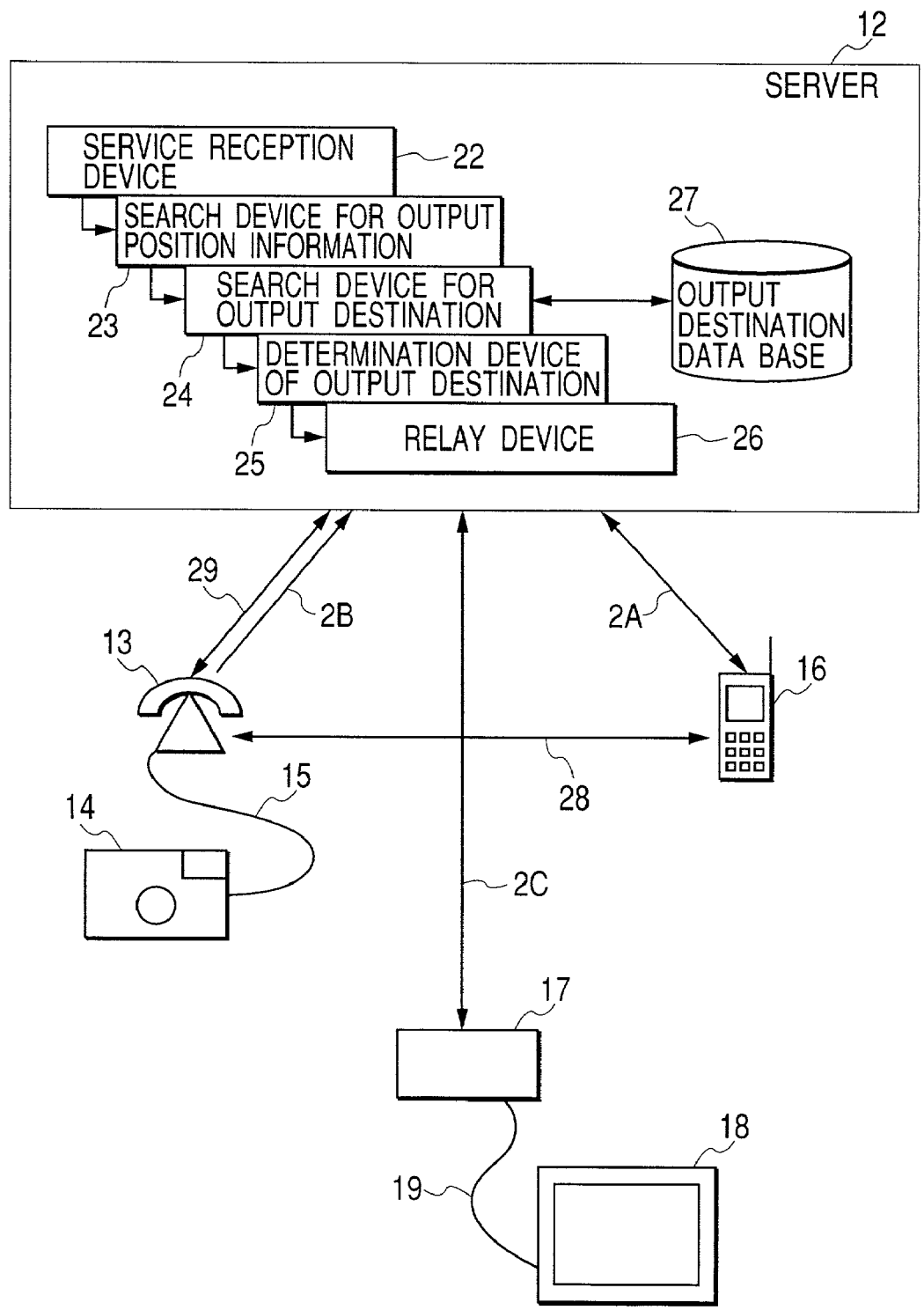
FIG. 2 is a block diagram illustrating functional blocks of a server and related communication lines according to the first embodiment of the present invention.

FIG. 2 is a block diagram illustrating functional blocks of the server 12 and related communication lines according to the embodiment.

The server 12 includes a service reception device 22, a search device for output position information 23, a search device for an output destination 24, a determination device of an output destination 25, a relay device 26 and an output destination database 27. These features are practically implemented by a CPU, a RAM, a ROM, a communication interface, an HD (a hard disk drive) and the like.

The service reception device 22 receives service request information from the network 11. The output-position information searching device 23 searches the service request information for position information on the first terminal 13 and another terminal (the second terminal 16) which is in communication with the first terminal 13 and the user of which wants to see an image from the first terminal 13. The output-destination searching device 24 searches plural processors 18 for a processor or processors 18 located in the neighborhood of the second terminal 16. The output-destination determining device 25 determines one of the processors 18 searched by the search device 24 so that the image will be displayed on the processor 18 determined. The relay device 26 receives an image signal (image data) from the terminal (the first terminal 13) from which the image is input, and transfers the received image signal to the processor 18 determined by the determination device 25 as the output destination. The output destination database 27 stores identifiers (identification information) for combinations of reception devices 17 and processors 18 while associating the identifiers with position information on the respective processors 18.

The reference numerals 28, 29, 2A, 2B and 2C are communication lines established in the network 11. The communication line 28 is a communication line (communication connection) for voice communication between the first terminal 13 and the second terminal 16. The communication line 29 is to transfer control information such as a service request between the first terminal 13 and the server 12. The communication line 2A is to transfer control information such as a service request between the second terminal 16 and the server 12. The communication line 2B is for image communication between the first terminal 13 and the server 12. The communication line 2C is for image communication between the server 12 and the reception device 17. Connection establishment procedures (FIG. 3) to be described below are used to establish the communication lines 2B and 2C.

Figure 3:
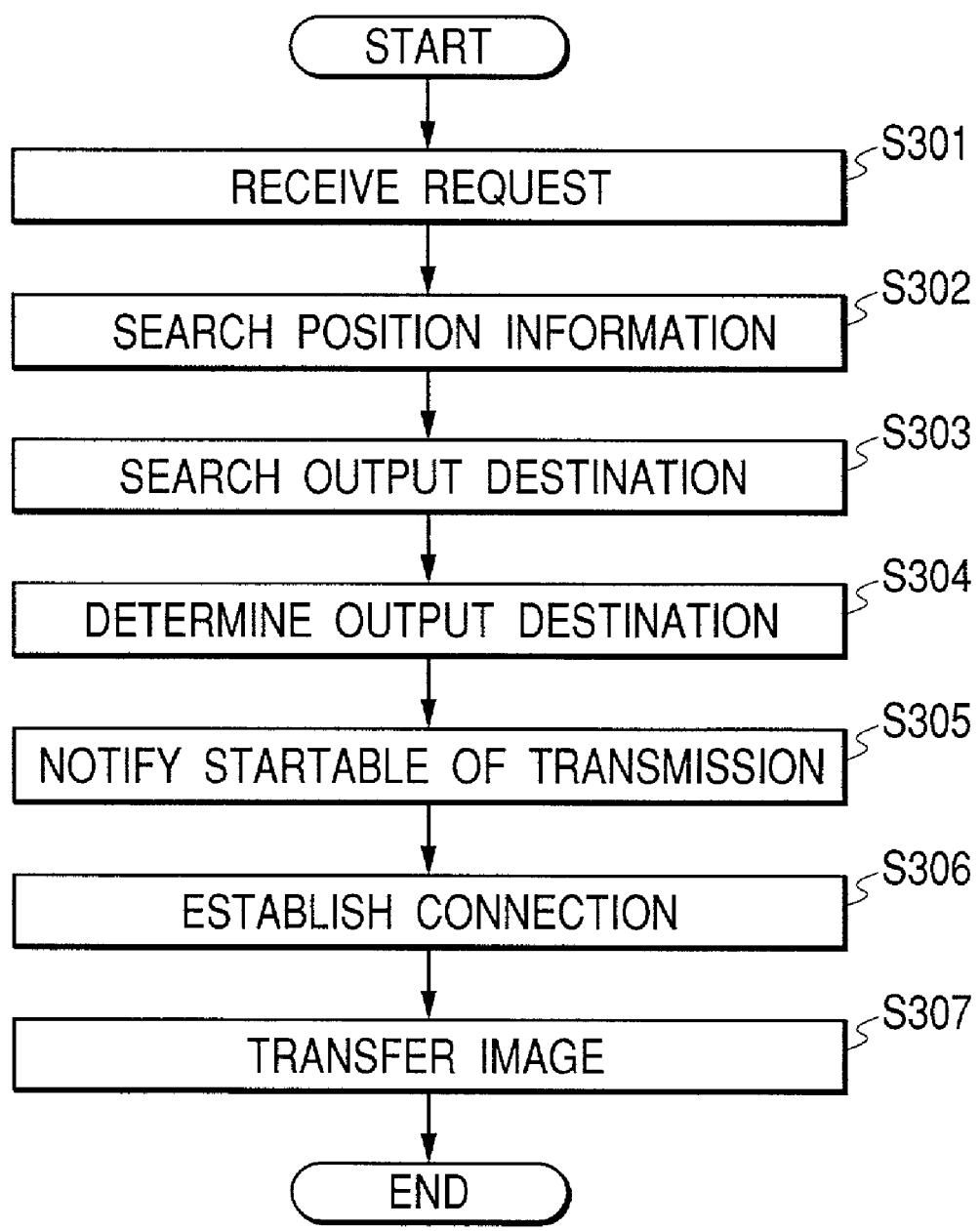
FIG. 3 is a flowchart illustrating processing for connection establishment according to the first embodiment of the present invention.

FIG. 3 is a flowchart illustrating processing for connection establishment according to the embodiment.

Suppose that the first and second terminals 13 and 16 are in voice communication with each other through the communication line 28. Suppose further that it is desired to display image sent from the first terminal 13 on a large screen. In this case, if the second terminal 16 receives the image data from the first terminal 13 and displays the same thereon as they are, no large-screen display can be obtained. Therefore, in the embodiment, the first terminal 13 or the second terminal 16 first requests the server 12 to display the image data on a processor 18 located in the neighborhood of the second terminal 16. The service request is sent from the first terminal 13 through the communication line 29 or the second terminal 16 through the communication line 2A. The server 12 receives the service request at the service reception device 22 (step S301).

It should be noted that the service request sent to the server 12 includes at least an identifier for identifying the first terminal 13, an identifier for identifying the second terminal 16, and information determinately indicating which terminal is the image-data sending side or the image-data receiving side. In this processing step of request reception, the server 12 extracts, from the service request information, the identifier of the first terminal 13 as the image sending side and the identifier of the second terminal 16 as the side that desires to display the image on a nearby processor 18. At this time, the identifier of the second terminal 16 is forwarded to the output-position information searching device 23.

Then the server 12 performs a position-information search (step S302). In other words, the search device 23 in the server 12 searches position information from information on all devices managed by the server 12 and the identifier forwarded in the previous step. Here, another management device such as another server in the network to which each terminal belongs may manage the position of each terminal in the network, functions and attributes of the terminal. In this case, the position-information search is so performed that the search device 23 forwards the identifier of the terminal concerned to the management device of the network to which the terminal belongs and receives position information on the terminal corresponding to the identifier.

When the terminal is a wired terminal, the identifier and the position information is fixedly determined. When the terminal is a wireless or mobile terminal, the position information is confirmed by checking in which base station and which area of the base station the wireless terminal is now located. Further, if the terminal has a function for detecting its own position information, the search device 23 will receive the position information directly from the terminal. The position information obtained by the output-position information searching device 23 is forwarded to the output-destination searching device 2.

Then the server 12 performs an output-destination search (step S303). In other words, the search device 24 in the server 12 searches an output destination or destinations on the basis of the position information and the contents of a service to be provided (for example, whether display service is requested). The output-destination search is performed by referring to the output destination database 27 for a processor 18 connected to a reception device 17 located in the neighborhood of the second terminal 16. As a result of the output-destination search, the search device 24 forwards, to output-destination determining device 25, an identifier or identifiers specifying a possible combination or combinations (not always one) of the reception device 17 and the processor 18.

Then the server 12 determines an output destination (step S304). In other words, the output-destination determining device 25 in the server 12 selects the optimum device from among the identifiers forwarded from the output-destination searching device 24 on the basis of the attributes of each device such as the size of the display screen. Then the determination device 25 determines a combination of identifiers specifying a combination of the reception device 17 and the processor 18 as the output destination. In this determination step, the determination device 25 may automatically make a determination in accordance with a predetermined algorithm, or it may present the second terminal 16 with the identifiers of the possible combinations forwarded from the search device 24 so that the user of the second terminal 16 will select one of the combinations as the output destination. Alternatively, the determination device 25 may select the combination closest to the second terminal 16. The identifier of the output destination determined by the output-destination determining device 25 is forwarded to the relay device 26.

Then the server 12 sends information to the first terminal 13 through the communication line 29 to notify the first terminal 13 that it can start transmission (step S305). Thus the first terminal 13 can judge whether the transmission of image data is possible.

Then the server 12 establishes a new connection for image communication (step S306). In other words, the server 12 establishes the communication line 2B (FIG. 2) with the first terminal 13 or between the first terminal 13 and the relay device 26 under the control of the server 12. At the same time, the server 12 establishes the communication line 2C (FIG. 2) between the relay device 26 under the control of the server 12 and the reception device 17 corresponding to the identifier the relay device 26 has received from the output-destination determining device 25.

In step S307, the first terminal 13 transmits image data to the server 12 or the relay device 26 through the communication line 2B. When the server 12 receives the image data, the relay device 26 transfers the image data to the reception device 17 through the communication line 2C.

The image data received by the reception device 17 is processed by the processor 18 and displayed on a large screen of the processor 18. Thus the user of the second terminal 16 can see the image from the first terminal 13 on the large screen of the processor 18 with maintaining the current call with the first terminal 13.

According to the embodiment, a new connection is established during voice communication in response to a request from the first terminal 13 or the second terminal 16, whereby the second terminal 16 obtains temporary permission to utilize the image display facility of the nearby processor 18. This makes it possible for a user of a portable terminal (second terminal 16) to access the image display facility of the nearby processor 18 in a simple configuration without the need to provide any dedicated interface and dedicated system switch between the first and second terminals 13 and 16. Thus the user of the portable terminal can see an image on a high-definition, large screen through mobile communications. In particular, the user of the portable terminal can utilize a nearby processor 18, improving the convenience of portability.

Second Embodiment

This embodiment is different from the first embodiment in the server structure and method of establishing a communication line for image data. The terminal devices such as the first terminal 13, the second terminal 16 and the processor 18 are the same as those in the first embodiment.

Figure 4:
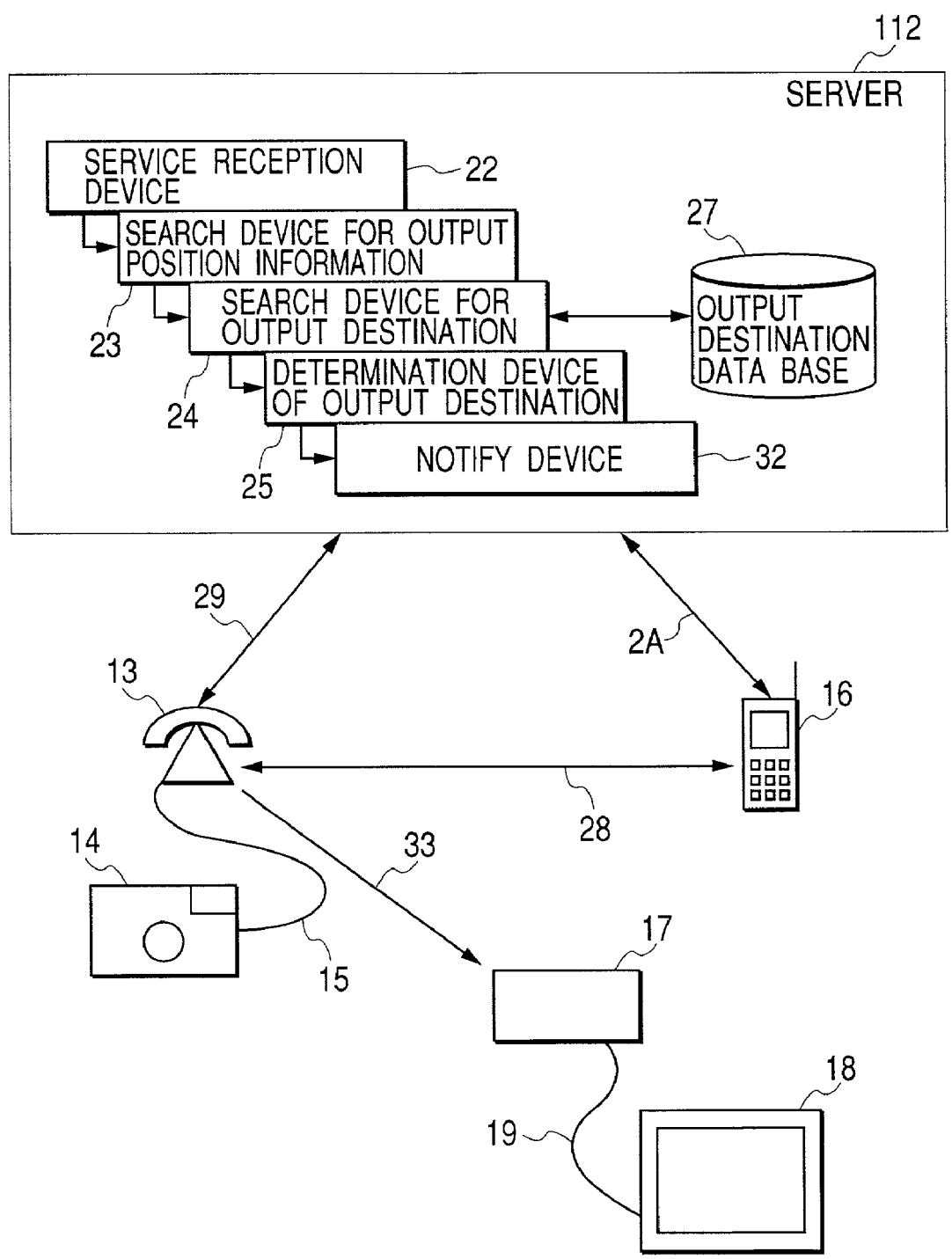
FIG. 4 is a block diagram illustrating functional bocks of a server and related communication lines according to a second embodiment of the present invention.

FIG. 4 is a block diagram illustrating functional blocks of a server 112 and related communication lines according to the second embodiment of the present invention.

The server 112 is different from the server 12 in the first embodiment in that it is provided with a notify device 32 instead of the relay device 26. The other features such as the service reception device 22 are the same as those of the server 12.

The notify device 32 notifies the first terminal 13 as the image sending side of the identifier or address of the processor 18 determined by the output-destination determining device 25. The communication lines 28, 29 and 2A are the same as those in the first embodiment. A point different from the first embodiment is a communication line 33, which is provided for image communication between the first terminal 13 and the reception device 17. Connection establishment procedures (FIG. 5) to be described below are used to establish the communication line 33.

Figure 5:
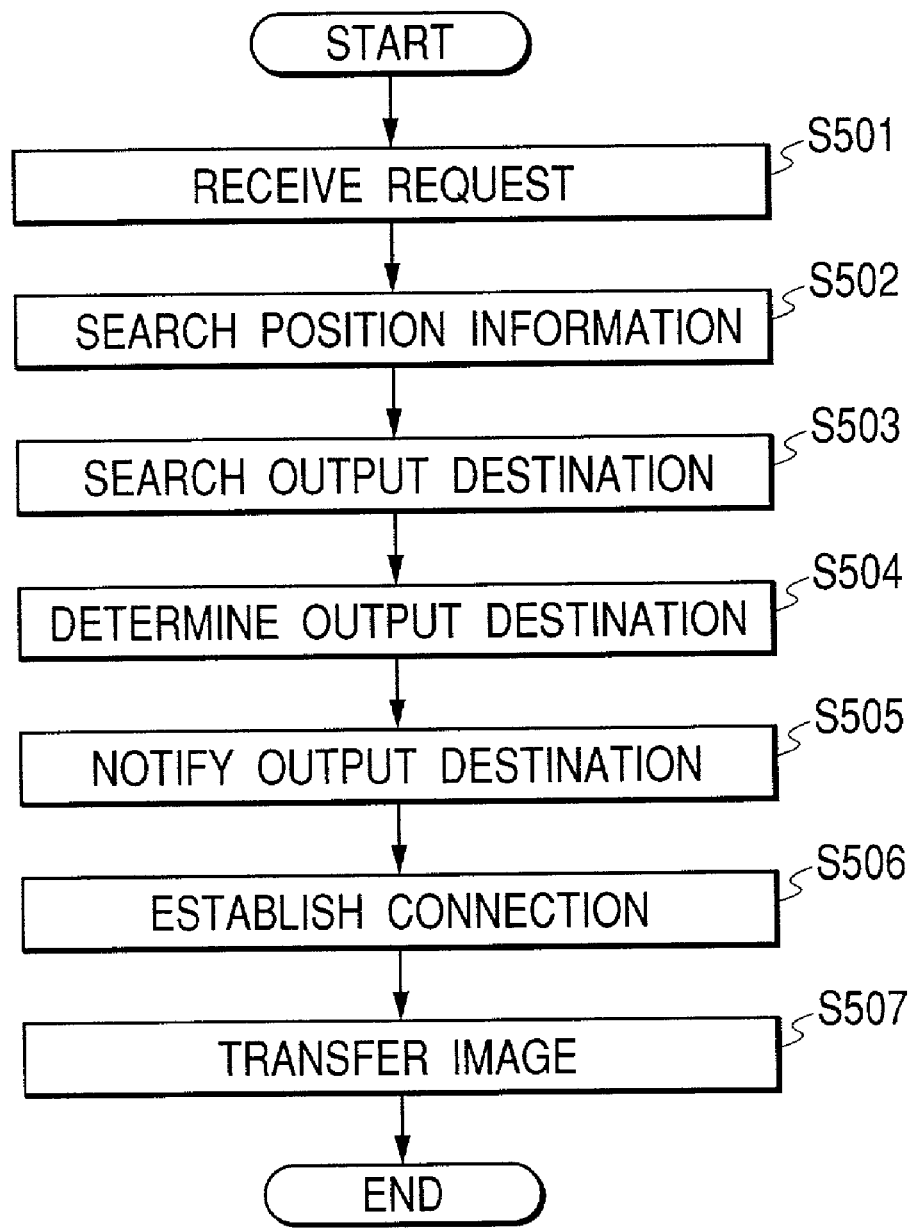
FIG. 5 is a flowchart illustrating processing for connection establishment according to the second embodiment of the present invention.

FIG. 5 is a flowchart illustrating processing for connection establishment according to the second embodiment.

At first, operations from steps S501 to S504 are performed in about the same manner as those from steps S301 to S304 in FIG. 3. The only difference is that the identifier of the output destination determined by the output-destination determining device 25 or the address to the reception device 17 is forwarded to the notify device 32 in step S504.

Then the server 112 performs notify processing. In other words, the notify device 32 in the server 112 notifies the identifier of the output destination determined or the address to the reception device 17 to the first terminal 13 through the communication line 29 (step S505).

Then the server 112 establishes a new connection for image communication (step S506). In other words, the first terminal 13 newly establishes the communication line 33 with the reception device 17 corresponding to the identifier of the output destination or the address received from the server 112 (FIG. 4). Thus a new connection for image communication is established through the communication line 33.

In step S507, the first terminal 13 transmits image data to the reception device 17 through the communication line 33.

The image data received by the reception device 17 is processed by the processor 18 and displayed on a large screen of the processor 18. Thus the user of the second terminal 16 can see the image from the first terminal 13 on the large screen.

The second embodiment can display the same effects as the first embodiment.

Third Embodiment

This embodiment is different from the first and second embodiments in the server structure and method of establishing a communication line for image data. The terminal devices such as the first terminal 13, the second terminal 16 and the processor 18 are the same as those in the first embodiment.

Figure 6:
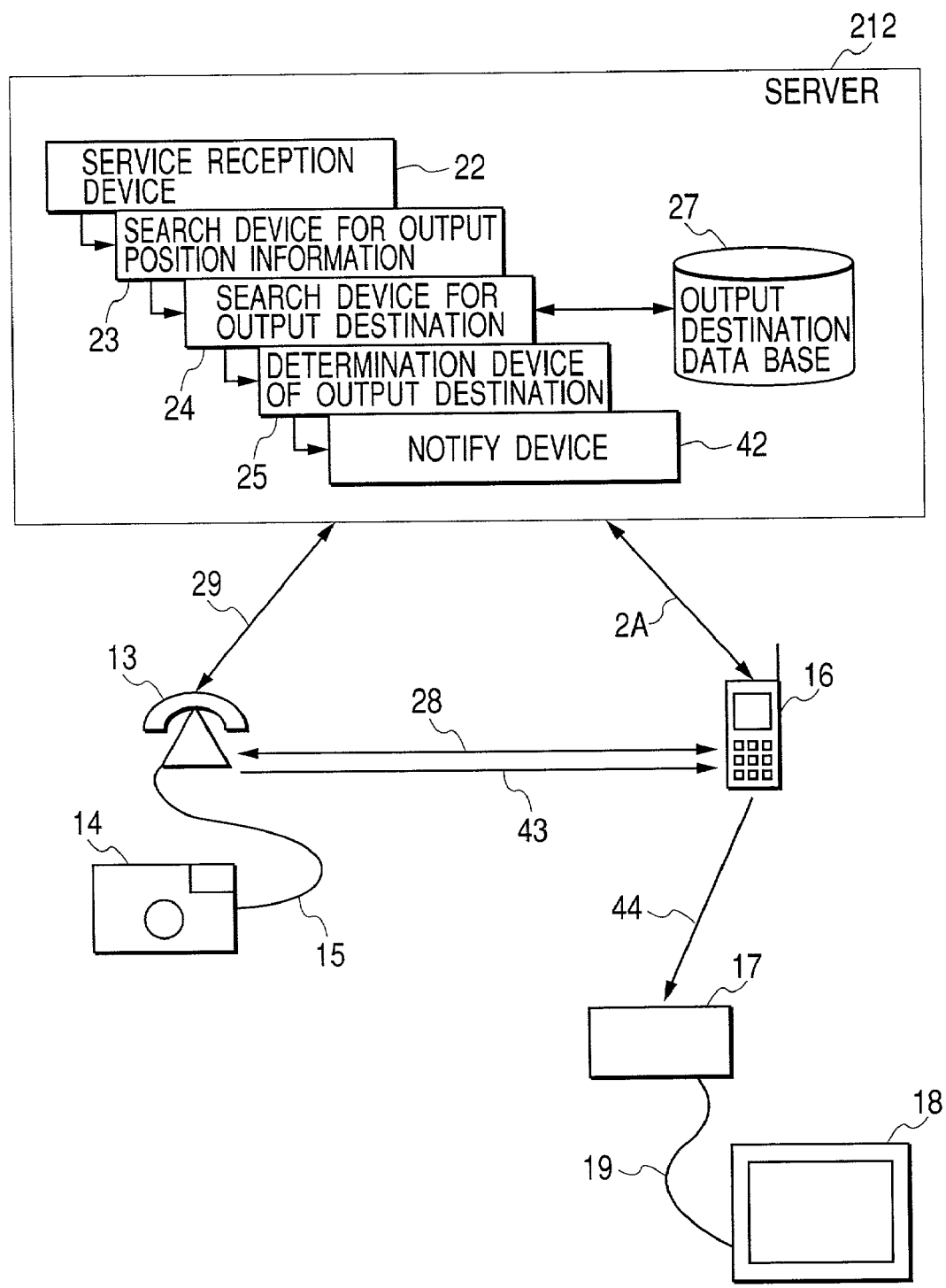
FIG. 6 is a block diagram illustrating functional bocks of a server and related communication lines according to a third embodiment of the present invention.

FIG. 6 is a block diagram illustrating functional blocks of a server 212 and related communication lines according to the third embodiment of the present invention.

The server 212 is different from the server 112 in the second embodiment in that it is provided with a notify device 42 instead of the notify device 32. The other features such as the service reception device 22 are the same as those of the server 112.

The notify device 42 notifies the second terminal 16 of the identifier of or address to the processor 18 determined by the output-destination determining device 25. The communication lines 28, 29 and 2A are the same as those in the first embodiment. Points different from the first embodiment are that a communication line 43 is provided for image communication between the first and second terminals 13 and 16, and a communication line 44 is provided for image communication between the second terminal 16 and the reception device 17. These communication lines 43 and 44 are established in the network 11.

Connection establishment procedures in this embodiment are basically the same as those in the second embodiment illustrated in FIG. 5. At first, operations corresponding to those from steps S501 to S504 are performed. The only difference is that the identifier of the output destination determined by the output-destination determining device 25 or the address to the reception device 17 is forwarded to the notify device 42 in step S504.

Then the server 212 performs notify processing in a step corresponding to step S505. In other words, the notify device 42 in the server 212 notifies the identifier of the output destination or the address to the reception device 17 forwarded in the previous step to the second terminal 16 through the communication line 2A.

Then the server 212 establishes a new connection for image communication in a step corresponding to step S506. In other words, the second terminal 16 newly establishes the communication line 43 for image communication with the first terminal 13, and the communication line 44 with the reception device 17 corresponding to the identifier of the output destination. Thus a new connection for image communication is established through the communication lines 43 and 44.

In the process corresponding to step S507, the first terminal 13 transmits image data to the second terminal 16 through the communication line 43. The second terminal 16 in turn transfers the received image data to the reception device 17 through the communication line 44.

The image data received by the reception device 17 is processed by the processor 18 and displayed on a large screen of the processor 18. Thus the user of the second terminal 16 can see the image from the first terminal 13 on the large screen.

The third embodiment can display the same effects as the first and second embodiments.

In the above-mentioned embodiments, the features constituting the server 12 (112 or 212), namely the service reception device 22, the output-position information searching device 23, the output-destination searching device 24, the output-destination determining device 25, the relay device 26 (or notify device 32 or 42), and the output destination database 27 may be incorporated into a single host computer, or distributed to two or more host computer on the network.

Further, although the above-mentioned embodiments illustrated the display processing of image data as an exemplary service feature, that is, the embodiments exemplified the transfer of image data while the first and second terminals 13 and 16 were in voice communication with each other. Further, the processor 18 was illustrated as an image processor. However, features of the present invention are not limited to those in the embodiments.

The present invention is applicable to various cases, for example, a case in which communication lines for voice and image communications are established concurrently, a case in which a communication line or lines for image communication are established prior to establishment of a communication line for voice communication, and a case in which only the communication line for image communication between the first terminal 13 and the reception device 17 is established without establishing the communication line for voice communication between the first and second terminals 13 and 16 so that only the image display service feature will be carried out.

According to the present invention, the features of each embodiment can also be implemented via software by supplying the network system with a storage medium with software program codes recorded thereon. In this case, a computer (or a CPU or MPU) in the network system reads out the program codes stored on the storage medium to execute the same.

The program codes themselves read out form the storage medium realize novel features of the present invention. In other words, the storage medium with the program codes stored thereon can constitute the present invention.

The storage medium for supplying the program codes may be of any medium, such as a floppy disk, a hard disk, an optical disk, a magneto-optical disk, a CD-ROM, a CD-R, a magnetic tap, a non-volatile memory card, a ROM, etc.

The execution of the program codes read out on a computer for realizing the features of the above-mentioned embodiments, of course, includes a case in which an operating system (OS) or a program run on a computer executes part or all of actual processing.

Further, the program codes read out from the storage medium may be written to an extended board inserted in a computer or an extended unit connected to the computer so that part or all of actual processing for realizing the features of the above-mentioned embodiments will be realized by a CPU provided for the extended board or extended unit.

As described above and according to the present invention, a terminal device can utilize functions of another terminal device without the need to provide a new dedicated interface or system switch. In particular, utilization of a nearby service providing device can also improve the convenience of portability. For example, upon transferring image data, various processing can be achieved in a simple configuration such as to display an image on a large display screen of a service providing device closest to a second terminal.

What is claimed is:

1. A server apparatus comprising:
   a discriminating device which discriminates a position of a second apparatus that is in communication with a first apparatus through a first communication line;
   a determining device which determines an output apparatus for outputting information transmitted to the server from the first apparatus in accordance with the position of the second apparatus discriminated by the discriminating device, wherein the output apparatus is separate from the second apparatus and in the neighborhood of the second apparatus;
   a forming device which performs processing for forming a second communication line with the output apparatus for outputting, by the output apparatus determined by the determining device, the information transmitted from the first apparatus, wherein the second communication line is different from the first communication line, and the first apparatus outputs the information for outputting by the output apparatus while maintaining the communication with the second apparatus via the first communication line; and
   a notifying device which notifies the first apparatus that it can start transmitting the information, in response to forming of the second communication line.

2. The server apparatus according to claim 1, wherein the determining device determines the output apparatus in response to receiving a request from the first apparatus or the second apparatus.

3. The server apparatus according to claim 1, wherein the determining device determines an apparatus adjacent to the second apparatus as the output apparatus.

4. The server apparatus according to claim 1, wherein the determining device determines the output apparatus on the basis of a database that stores identification information for identifying each of plural output apparatuses on a network and position information indicative of a position of each of the plural output apparatuses.

5. The server apparatus according to claim 1, wherein the second communication line is formed between the first apparatus and the output apparatus through the server apparatus.

6. The server apparatus according to claim 5, wherein the server apparatus forwards the information which is transmitted to the server apparatus from the first apparatus to the output apparatus.

7. The server apparatus according to claim 1, wherein the forming device notifies the first apparatus of information of the output apparatus determined by the determining device, and Wherein the first apparatus forms the second communication line on the basis of information notified by the forming device.

8. The server apparatus according to claim 1, wherein the second communication line is formed between the first apparatus and the output apparatus through the second apparatus.

9. The server apparatus according to the claim 1, wherein the forming device notifies the second apparatus of information of the output apparatus determined by the determining device, and wherein the second apparatus forms the second communication line on the basis of information notified by the forming device.

10. The server apparatus according to claim 1, wherein the second apparatus temporarily obtains permission to utilize the output apparatus by the second communication line being formed.

11. The server apparatus according to claim 1, wherein the determining device determines the output apparatus for visibly outputting the information transmitted from the first apparatus.

12. A control method for a server apparatus comprising:
    a discriminating step of discriminating a position of a second apparatus that is in communication with a first apparatus through a first communication line;
    a determining step of determining an output apparatus for outputting information transmitted from the first apparatus to the server in accordance with position of the second apparatus discriminated in the discriminating step, wherein the output apparatus is separate from the second apparatus and in the neighborhood of the second apparatus;
    a forming step of performing processing for forming a second communication line with the output apparatus for outputting, by the output apparatus determined in the determining step, the information transmitted from the first apparatus, wherein the second communication line is different from the first communication line, and the first apparatus outputs the information for outputting by the output apparatus while maintaining the communication with the second apparatus via the first communication; and
    a notifying device which notifies the first apparatus that it can start transmitting the information, in response to forming of the second communication line.

13. A non-transitory computer-readable storage medium on which is stored a computer-executable program for controlling a server apparatus, the program comprising:
    a discriminating step of discriminating a position of a second apparatus that is in communication with a first apparatus through a first communication line;
    a determining step of determining an output apparatus for outputting information transmitted from the first apparatus to the server in accordance with position of the second apparatus discriminated in the discriminating step, wherein the output apparatus is separate from the second apparatus and in the neighborhood of the second apparatus;

a forming step of performing processing for forming a second communication line with the output apparatus for outputting, by the output apparatus determined in the determining step, the information transmitted from the first apparatus, wherein the second communication line is different from the first communication line, and the first apparatus outputs the information for outputting by the output apparatus while maintaining the communication with the second apparatus via the first communication line; and a notifying device which notifies the first apparatus that it can start transmitting the information, in response to forming of the second communication line.

* * * * *